US009554553B2

(12) United States Patent
Casto et al.

(10) Patent No.: US 9,554,553 B2
(45) Date of Patent: Jan. 31, 2017

(54) ANIMAL HOUSING ASSEMBLY (71) Applicant: CENTRAL GARDEN & PET COMPANY, Walnut Creek, CA (US)

(72) Inventors: Jason Casto, Lombard, IL (US); Larry Sternal, Bartlett, IL (US)

(73) Assignee: CENTRAL GARDEN & PET COMPANY, Walnut Creek, CA (US)

( * ) Notice: Subject to any disclaimer, the term of this patent is extended or adjusted under 35 U.S.C. 154(b) by 80 days.

(21) Appl. No.: 13/848,115

(22) Filed: Mar. 21, 2013

(65) Prior Publication Data
US 2014/0116347 A1  May 1, 2014

Related U.S. Application Data (60) Provisional application No. 61/613,826, filed on Mar. 21, 2012.

(51) Int. Cl.
*A01K 1/03* (2006.01)
*A01K 1/01* (2006.01)
*A01K 31/06* (2006.01)

(52) U.S. Cl.
CPC ........ *A01K 1/03* (2013.01); *A01K 1/032* (2013.01)

(58) Field of Classification Search
CPC ........ A01K 1/0107; A01K 1/03; A01K 1/011; A01K 1/0245; A01K 31/04; A01K 31/06; A01K 31/14; A01K 31/007; A01K 31/00; A01K 31/08
USPC ................................ 119/342, 458, 462, 479
See application file for complete search history.

(56) References Cited

U.S. PATENT DOCUMENTS

| | | | |
|---|---|---|---|
| 1,963,414 A | 6/1934 | Little | |
| 3,100,474 A * | 8/1963 | Schneider | 119/166 |
| 3,792,803 A * | 2/1974 | Kessler | B65D 47/286 |
| | | | 215/315 |
| 3,815,549 A | 6/1974 | Opmeer | |
| 4,027,625 A | 6/1977 | Wheeler | |
| 4,572,107 A | 2/1986 | Clarizo | |
| 4,838,204 A * | 6/1989 | Young | 119/471 |
| 4,909,188 A * | 3/1990 | Tominaga | 119/474 |
| 4,917,047 A * | 4/1990 | Wazeter, III | 119/474 |
| 5,355,837 A * | 10/1994 | Reyes | 119/161 |
| 5,544,619 A * | 8/1996 | Braun | 119/474 |
| 5,794,567 A * | 8/1998 | Itzhak | 119/416 |
| 6,129,050 A * | 10/2000 | Carbajal | 119/165 |
| 2004/0194722 A1 | 10/2004 | Plante et al. | |
| 2005/0115516 A1* | 6/2005 | Marchioro | 119/705 |

(Continued)

Primary Examiner — Andrea Valenti
(74) Attorney, Agent, or Firm — Grossman, Tucker, Perreault & Pfleger, PLLC (57) ABSTRACT An animal housing assembly includes a cage assembly coupled to a base member to provide an enclosure for one or more animals to be kept in captivity. The base member includes a slidable tray coupled thereto, the tray being configured to move from a closed position to an open position to allow cleaning of the base member. When in a closed position, a portion of the tray forms a portion of the floor of the base member. When the tray moves from the closed position to the open position, the tray translates in a direction away from the base member, thereby exposing an aperture defined in the floor of the base member. The aperture may be shaped and/or sized to allow debris to fall through the floor of the base member, thereby allowing removal of unwanted debris and cleaning of the base member.

19 Claims, 8 Drawing Sheets (56) References Cited

U.S. PATENT DOCUMENTS

| | | | |
|---|---|---|---|
| 2005/0229865 A1* | 10/2005 | Migita .......................... | 119/479 |
| 2005/0235923 A1* | 10/2005 | Niki .............................. | 119/479 |
| 2006/0288952 A1 | 12/2006 | Plante et al. | |
| 2008/0110412 A1* | 5/2008 | Shimoda et al. ............. | 119/473 |
| 2009/0260579 A1* | 10/2009 | Cohen et al. ................. | 119/469 |
| 2012/0210947 A1* | 8/2012 | DiPaolo ........................ | 119/472 |

* cited by examiner

FIG. 9

ANIMAL HOUSING ASSEMBLY

CROSS-REFERENCE TO RELATED APPLICATIONS

The present non-provisional application claims the benefit of U.S. Provisional Patent Application Ser. No. 61/613,826, filed Mar. 21, 2012, the entire disclosure of which is incorporated herein by reference.

FIELD

The present disclosure relates generally to animal cages, and, more particularly, to an easily cleanable animal housing assembly.

BACKGROUND

The cleaning of animal cages may be a cumbersome and relatively time-consuming task. The ownership of caged animals may involve a compromise between not performing an inordinate amount of cleaning and having a barely acceptable dirty cage. A number of easy-to-clean animal cage assemblies have been suggested. Some animal cage assemblies include rolls of paper adjacent to floors of cages from which paper can be pulled across the floors to periodically clean the floors. A major difficulty in the use of these types of cage assemblies is that feed and other dry materials may easily work their way under the paper and are not taken out of the cages by pulling the paper across the floors. Additionally, some animal cage assemblies require some form of disassembly in order to clear debris (e.g., food, animal waste, etc.), thereby requiring a degree of work necessary which may be undesirable.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

The present disclosure is generally directed to an animal housing assembly configured to provide a relatively easy means of cleaning debris, including, but not limited to, food particles, animal waste and/or animal bedding from the housing. Generally, an animal housing assembly consistent with the present disclosure includes a cage assembly coupled to a base member to provide an enclosure for one or more animals to be kept in captivity. The base member may include a slidable tray coupled thereto. The tray may be configured to move from a closed position to an open position to allow cleaning of the base member. More specifically, when in a closed position, a portion of the tray forms a portion of the floor of the base member. When the tray moves from the closed position to the open position, the tray translates in a direction away from the base member, thereby exposing an aperture defined in the floor of the base member. The aperture may be shaped and/or sized to allow debris to fall through the floor of the base member, thereby allowing removal of unwanted debris and cleaning of the base member. The animal housing assembly may further include a locking member configured to provide a means of selectively securing one or more doors permitting access to the cage assembly in a closed position.

An animal housing assembly consistent with the present disclosure may provide a user with a relatively simple means of cleaning the housing with relatively minimal effort. More specifically, unwanted debris may be removed from the animal housing assembly without requiring cumbersome disassembly of the housing, such as removal of the cage assembly from the base member. Additionally, an animal housing assembly consistent with the present disclosure may provide safety and security, particularly in regards to restricting access to the contents of the housing.

Figure 1:
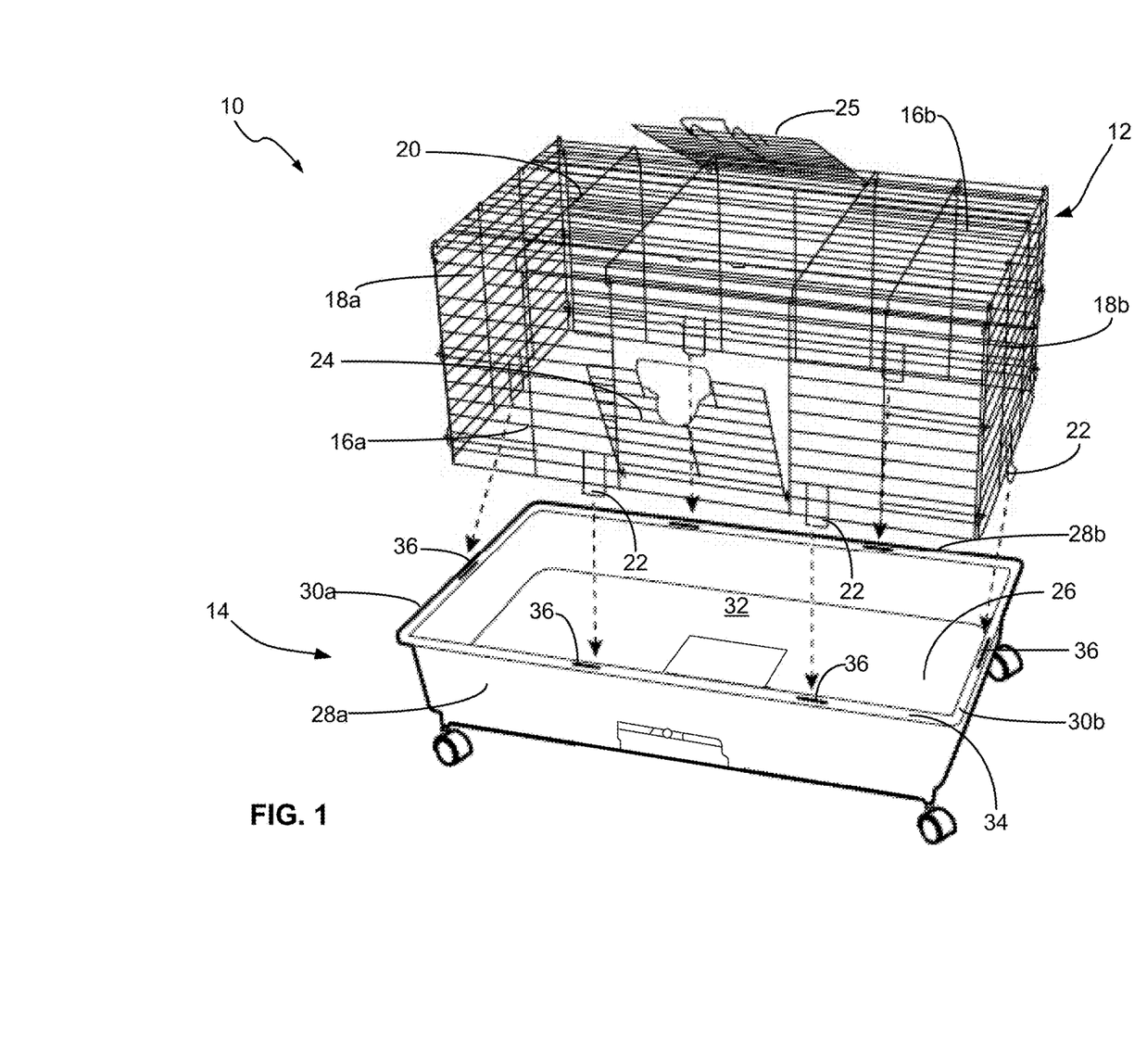
FIG. 1 is a perspective exploded view of an animal housing assembly consistent with the present disclosure.

Turning to FIG. 1, an exploded view of an animal housing assembly 10 consistent with the present disclosure is illustrated. Generally, the animal housing assembly may include a cage assembly 12 coupled to a base member 14. The cage assembly 12 may include a first set of opposing walls 16a, 16b, a second set of opposing walls 18a, 18b, and a top wall 20. As shown, each of the walls 16a-20 may be substantially flat and planar and may be coupled to one another such that the cage assembly 12 is substantially rectangular in shape. In the illustrated embodiment, the walls 16a-20 may include a wire grill configuration. It should be noted that in other embodiments, the walls may include other configurations generally understood by one of ordinary skill in the art.

The walls may be coupled to one another by a variety of known fastening methods and means. For example, some of the walls may be coupled to one another by way of one or more hinges, snap-fit members, hooks, and the like. The cage assembly 12 may be of modular nature such that all of the walls may be separated from one another. The cage assembly 12 may further be of knock down construction, where some of the walls may be folded into a substantially flat arrangement while still coupled to adjacent walls.

Some of the walls may include one or more doors for permitting entry and egress from within the cage assembly 12. For example, wall 16a may include a door 24 pivotally supported so that it may move from a closed position (not shown), in which the door 24 is substantially parallel to the wall 16a, to an open position, in which the door is substantially perpendicular to the wall 16a. Similarly, the top wall 20 may include a door 25 permitting access to the cage assembly 12 via the top wall 20. Some of the walls may further include protrusions 22 extending therefrom, wherein the protrusions 22 may be configured to couple the cage assembly 12 to the base member 14, described in greater detail herein.

The base member 14 may include a floor 26 and side walls 28a-30b extending upwardly about the entire periphery of the floor 26, thereby forming a cavity 32 within. As shown, the base member 14 may be substantially rectangular in shape, such that side walls 28a, 28b oppose one another and side walls 30a, 30b oppose one another. The side walls 28a-30b may terminate at an edge 34 extending along a periphery of an open end of the base member 14. As shown, the edge 34 may include one or more recesses or slots 36. The slots 36 may be shaped and/or sized to receive the protrusions 22 extending from one or more walls of the cage assembly 12, thereby allowing the walls of the cage assembly 12 to securely rest upon the edge 34 of corresponding sidewalls of the base member 14. For example, protrusions 22 extending from walls 16a, 16b of the cage assembly 12 may be received within corresponding slots 36 defined on the edge 34 of side walls 28a, 28b of the base member 14. Similarly, protrusions 22 extending from walls 18a, 18b may be received within corresponding slots 36 on the edge 34 of side walls 30a, 30b.

Figure 4:
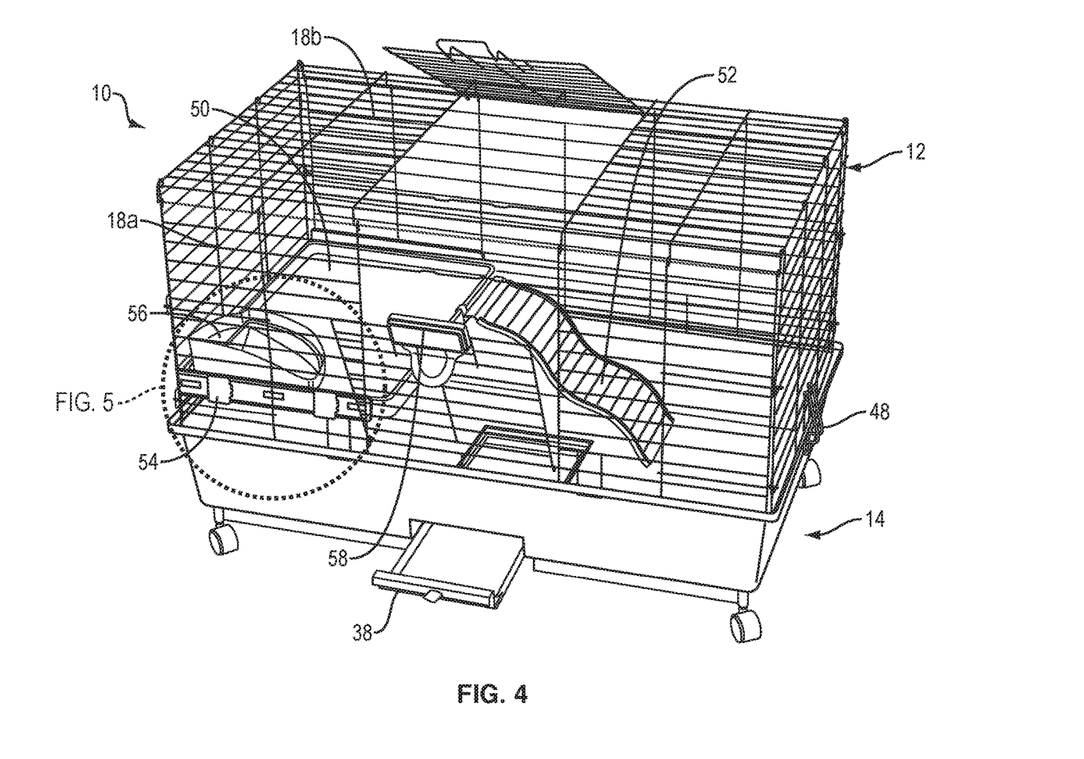
FIG. 4 is a perspective view of an animal housing assembly consistent with the present disclosure including a shelf member and a ramp member positioned within.

It should be noted that the cage assembly 12 may further include a locking mechanism 48 (shown in FIG. 4) to secure the cage assembly 12 to the base member 14. For example, as shown in FIG. 4, one or more pivoting latches 48 may be located on the cage assembly 12 to selectively engage a portion of the base member 14 with at least a wall of the cage assembly 12. As generally understood by one skilled in the art, the pivoting latch 48 may include flanges configured to extend under the edge 34 of the base member 14 to hold the cage assembly 12 to the base member 14 when the latch 48 is in the closed position. It should be noted that in other embodiments, other types of known locking mechanisms may be used, such as rotating knobs, snaps, etc.

Figure 2A:
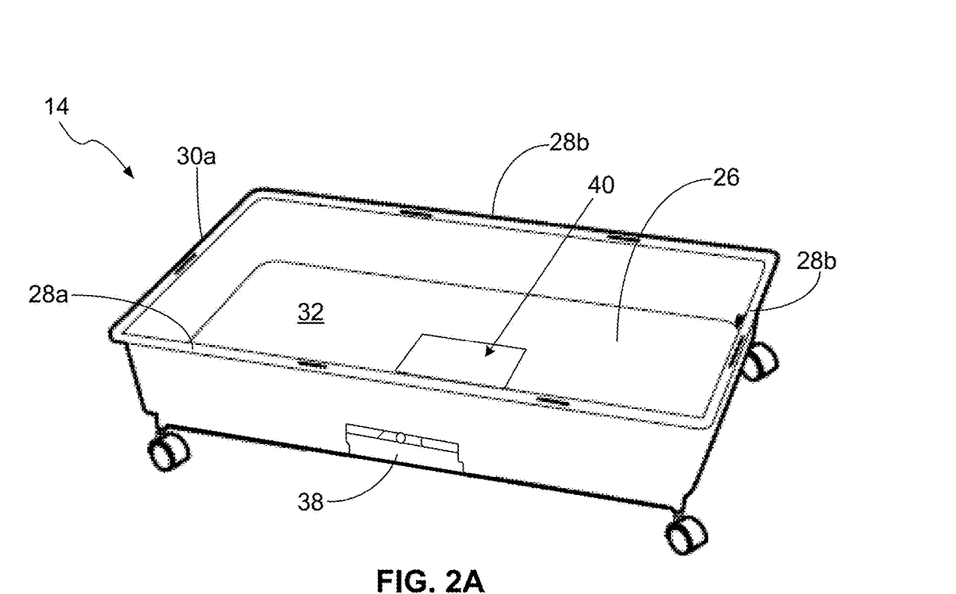
FIGS. 2A and 2B are perspective views of one embodiment of a base of an animal housing assembly consistent with the present disclosure showing a slidable tray in first and second positions, respectively.
Figure 2B:
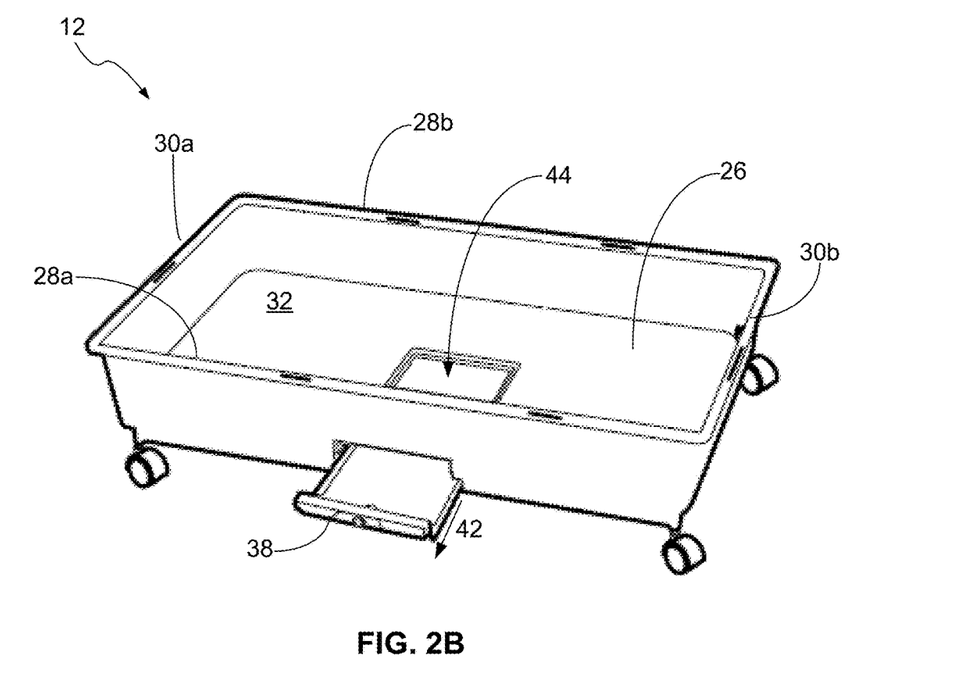

Turning to FIGS. 2A and 2B, perspective views of a base member 14 consistent with the present disclosure are illustrated. As shown, the base member 14 may include a slidable tray 38 coupled thereto. More specifically, the tray 38 may be configured to move between a first position (shown in FIG. 2A) and a second position (shown in FIG. 2B), and any position therebetween. FIG. 2A illustrates the tray 38 in a first position (e.g. closed position) in which a top surface of the tray 38 and the floor 26 of the base member 14 form a substantially planar surface. More specifically, when in a closed position, a portion of the tray 38 may form a portion of the floor 26 of the base member 14, as indicated by arrow 40.

FIG. 2B illustrates the tray 38 moving from a closed position to the second position (e.g. open position) to allow for cleaning of the base member 14. As shown, the tray 38 may be configured to move in direction away from a sidewall of the base member 14, as indicated by arrow 42. The tray 38 may be slidingly coupled to base member 14 by means generally known and understood by one skilled in the art. For example, the floor 26 of the base member 14 may include channels configured to receive tracks defined on sides of the tray 38 or vice verse (e.g. base member 14 includes tracks configured to be received within channels defined on sides of tray 38). The tray 38 may further include a locking member (not shown) configured to securely couple the tray 38 to the base member 14 in a closed position and prevent the tray 38 from being moved to the open position. The locking member may further be configured to be disengaged, such that the tray 38 may be moved from the closed position to the open position.

As the tray 38 moves from the closed position to the open position, an aperture 44 defined in the floor 26 of the base member 14 is exposed. The aperture 44 may be shaped and/or sized to allow debris to fall through the floor 26 of the base member 14, thereby allowing removal of debris and cleaning of the base member 14.

Figure 3:
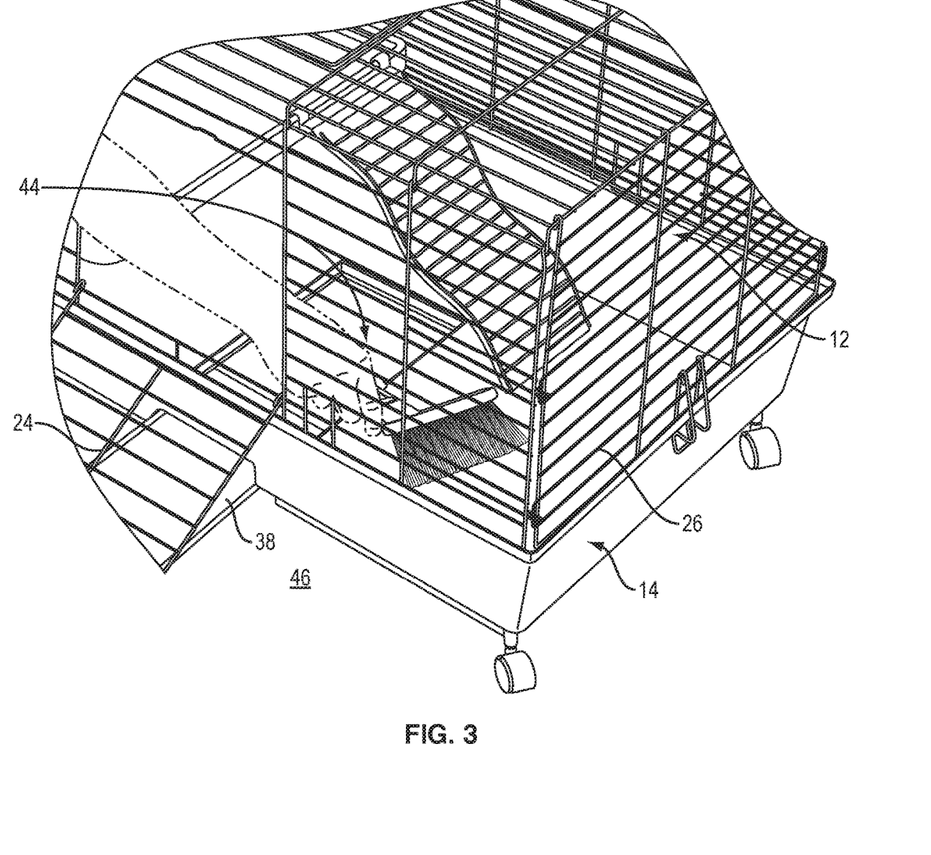
FIG. 3 illustrates a method of cleaning out an animal housing assembly consistent with the present disclosure.

FIG. 3 generally illustrates a method of cleaning out an animal housing assembly 10 consistent with the present disclosure. When the animal housing 10 is to be cleaned, relatively few steps are required. As shown, a user need only open a door 24 of one of the walls of the cage assembly 12 to access and clean the housing 10. While the tray 38 is in the open position, a user need only sweep any unwanted debris (e.g. food particles, animal bedding, animal waste, etc.) into the aperture 44, wherein the unwanted debris may fall through the aperture 44 and out of the base member 14. A user may position the base member 14 over a waste receptacle 46, such that any unwanted debris may be collected therein. As shown, a user need only gain access to the interior of the housing assembly 10 in order to clean debris therefrom. More specifically, rather than disassembling the cage assembly 12 from the base member 14, a user need only place the tray 38 in an open position and open a door 24 to gain access to the interior of the housing assembly 10 in order to clean.

The base member 14 may include one or more durable materials configured to provide relatively easy clean up of material wastes, including animal excrement. The material may include, but is not limited to, either natural or synthetic materials such as polymers and/or co-polymers. Examples may include polyurethane, latex, natural rubber, nylon (polyamides), polyester, polyethylene, polypropylene, PVC, fluoroplastics, block copolymers, polyethers and composites thereof. The floor 26 of the base member 14 may further include a coating configured to provide relatively low friction that may provide improved cleaning performance. For example, the coating may be one that inherently rejects the attachment of animal waste and thereby provides a user with a much easier task of maintaining a clean surface and sanitary conditions.

Turning to FIGS. 4-7, a variety of accessories configured to be included within an animal housing assembly 10 consistent with the present disclosure are illustrated. FIG. 4 is a perspective view of an animal housing assembly 10 including a shelf member 50 and a ramp member 52 positioned within. The housing assembly 10 may further include a feeding dish 56 positioned on a portion of the shelf member 50. The animal housing assembly 10 may further include a locking member 58 configured to provide a means of selectively securing one or more doors of the cage assembly 12 in a closed position, described in greater detail herein.

Figure 5:
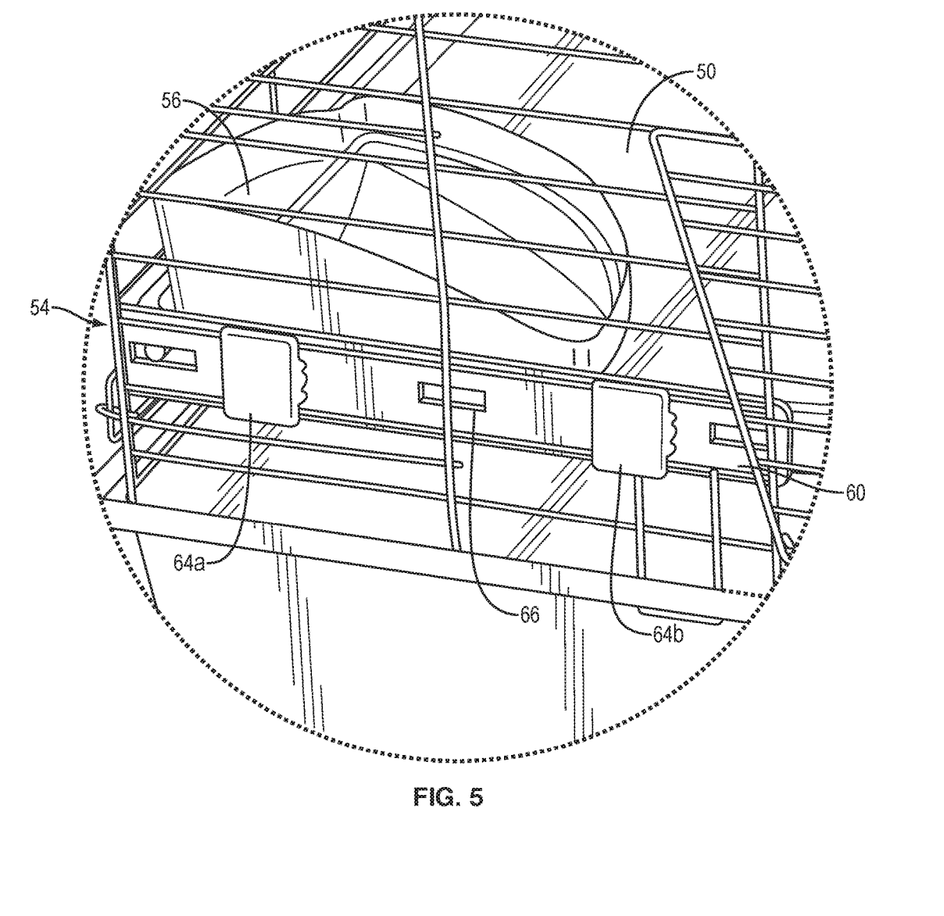
FIG. 5 is an enlarged perspective view of a portion of the animal housing assembly of FIG. 4 illustrating
Figure 6:
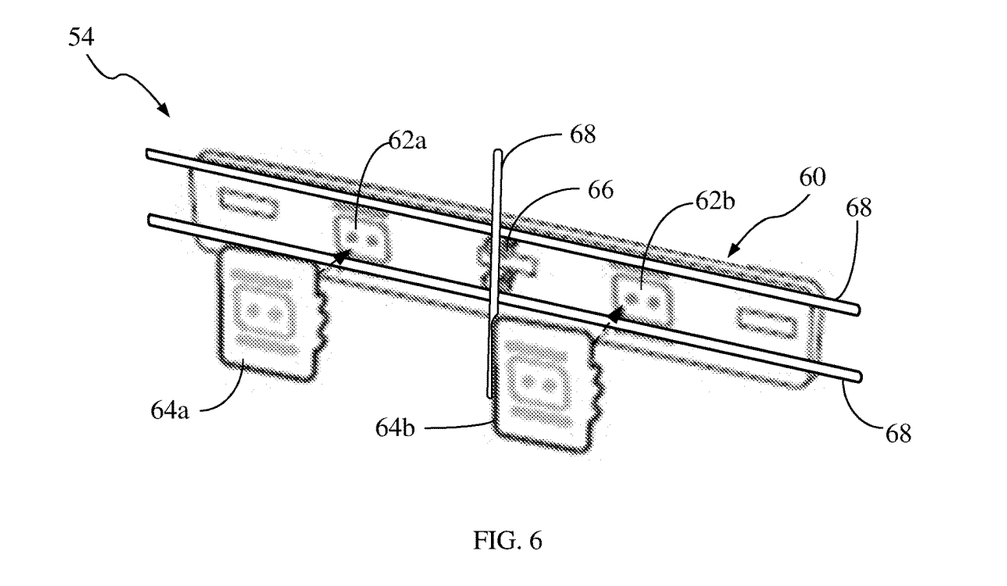
FIG. 6 is a perspective view of a bracket assembly configured to retain the shelf member within the cage assembly of the animal housing assembly of FIG. 4.

Generally, the shelf member 50 may be retained within the cage assembly 12 by way of bracket assemblies 54 secured to opposing walls (e.g. walls 18a, 18b) of the cage assembly 12. As shown in FIGS. 5 and 6, a bracket assembly 54 may be removably coupled to portions of the wire grilles of a wall of the cage assembly 14 by way of snap-fit connection with the grille wires. The bracket assembly 54 may include a body 60 having one or more receiving portions 62a, 62b configured to receive corresponding tab members 64a, 64b. As shown, the body portion 60 may include a location feature 66 configured to receive a grille wire 68 (grill wire 68 in vertical orientation) when the body 60 is positioned on an interior of the wall. Upon receiving the grille wire 68 within the location feature 66, the tab members 64a, 66b may be coupled with the corresponding receiving portions 62a, 62b of the body such that grille wires 68 in horizontal orientation are positioned between the body 60 and the tab members 64a, 64b. Coupling the tab members 64a, 64b with the receiving portions 62a, 62b secures the body 60 to the wall.

Figure 7:
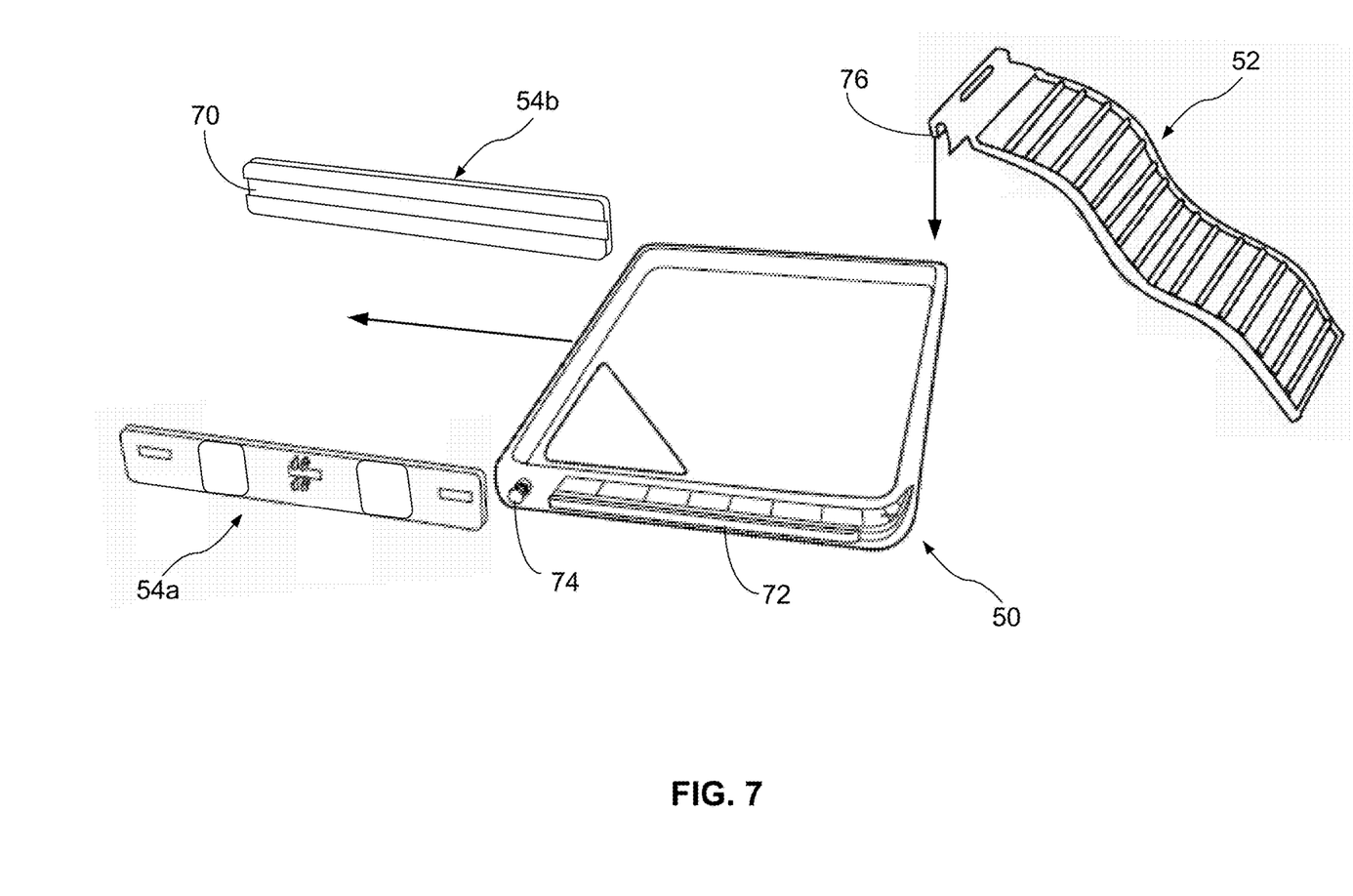
FIG. 7 is a perspective view of the bracket assembly, shelf member and ramp member consistent with the present disclosure.

Turning to FIG. 7, the bracket assemblies 54a, 54b, shelf member 50 and ramp member 52 consistent with the present disclosure are illustrated. As previously described, the bracket assemblies 54a, 54b may be configured to retain the shelf member 50 within the cage assembly 12. More specifically, each bracket assembly 54 include a channel 70 defined along a length of an interior surface of the body 60. The channel 70 may be shaped and/or sized to receive a corresponding track 72 and protrusion 74 defined along an outer edge of a side of the shelf member 50. The shelf member 50 may include opposing sides, each of which includes a track 72 and protrusion 74 extending therefrom configured to be received within a corresponding channel 70 of the bracket assemblies 54a, 54b. The shelf member 50 may slide along the bracket assemblies 54 and may provide ease for the user when cleaning the housing 10. Aside from being completely removable, the shelf member 50 may also be configured to tip (e.g. hang) from the bracket assemblies 54. More specifically, the protrusions 74 may provide an axis about which the shelf member 50 may pivot in certain positions. This may further increase the flexibility as far as configurations are concerned. The ramp member 52 may be securely coupled to a portion of the shelf member 50 by way of snap-fit means 76.

Figure 8:
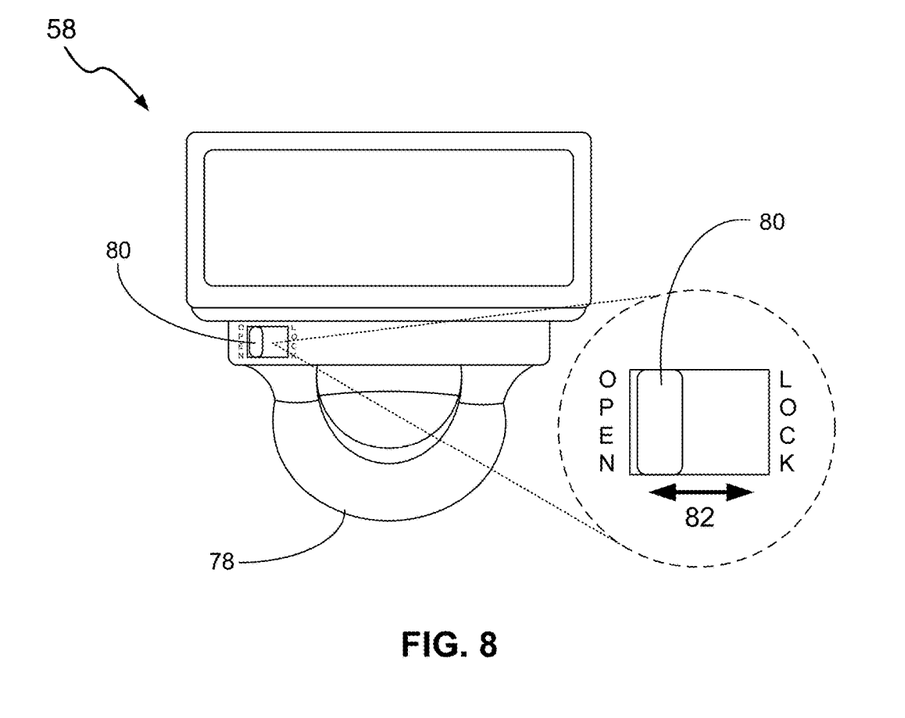
FIGS. 8 and 9 illustrate methods of operating a locking member of a animal housing assembly consistent with the present disclosure.
Figure 9:
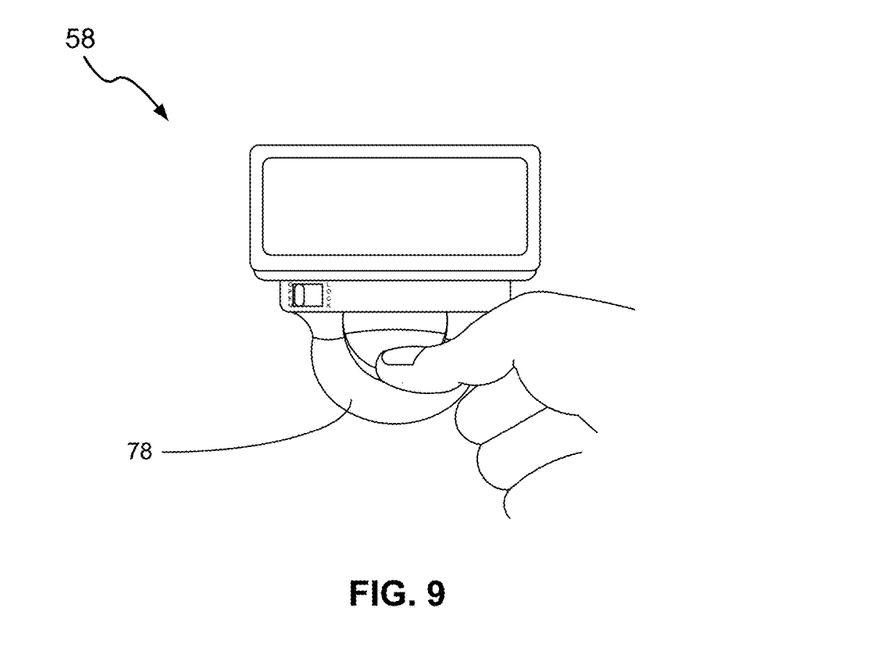

FIGS. 8 and 9 illustrate methods of operating a locking member of one or more doors of the animal housing assembly consistent with the present disclosure. Generally, the locking member 58 may be provided to secure a door 24 of the cage assembly 12 in a closed position. As shown, the locking member 58 may include a handle 78 and a selectable locking switch 80. The locking member 58 may include a means of engaging (e.g. locking) and disengaging (unlocking) a portion of the wire grille of a wall upon which the door 24 is positioned. The handle 78 may be manipulated (e.g. pulled in a first direction) so as to disengage the locking member 58 from the wire grille and allow the door 24 to open.

The locking switch 80 may be configured to prevent movement of the handle 78, thereby effectively preventing the door 24 from being opened. For example, in one embodiment, the locking switch 80 may be moveable between a disengaged position (e.g. open) and an engaged position (e.g. lock) as indicated by arrows 82. When the locking switch 80 is in an engaged position, the locking switch 80 may prevent the handle 78 from moving and when the locking switch 80 is in a disengaged position, the handle 78 may be moved.

According to one aspect of the present disclosure, there is provided an animal housing assembly. The animal housing assembly includes a collapsible cage assembly configured to transition between an expanded state and a collapsed state and a base assembly for providing support for the cage assembly when the cage assembly is in the expanded state to form an enclosure. The base assembly includes a floor having an aperture defined therein, at least one wall extending upwardly therefrom and forming a cavity within the base assembly and a tray slidingly coupled to the floor. The tray is configured to move between at least a fully closed position, wherein the tray covers the aperture of the floor and forms a portion of the floor, and a fully open position, wherein the aperture in the floor is exposed.

According to yet another aspect of the present disclosure, there is provided an animal housing assembly. The animal housing assembly includes a collapsible cage assembly configured to transition between an expanded state and a collapsed state. The collapsible cage assembly includes a top panel having a substantially rectangular shape, first and second walls rotatably coupled to respective first and second ends of the top panel and third and fourth walls rotatably coupled to respective third and fourth ends of the top panel and opposing one another. When the cage assembly is in the expanded state, the first and second walls oppose one another and the third and fourth walls oppose one another to form a cage interior.

The animal housing assembly further includes a base assembly for providing support for the cage assembly when the cage assembly is in the expanded state to form an enclosure. The base assembly includes a floor having a substantially rectangular shape and having an aperture defined therein and first and second opposing side walls extending upwardly from respective first and second opposing sides of the floor and a third and fourth opposing side walls extending upwardly from respective third and fourth opposing sides of the floor. The first, second, third and fourth side walls and the floor forming a cavity within the base assembly. The base assembly further includes a tray slidingly coupled to the floor, the tray is configured to move between at least a fully closed position, wherein the tray covers the aperture of the floor and forms a portion of the floor, and a fully open position, wherein the aperture in the floor is exposed. The tray and the floor form a substantially continuous surface when the tray is in the fully closed position.

According to another aspect of the present disclosure, there is provided an animal housing assembly. The animal housing assembly includes a collapsible cage assembly configured to transition between an expanded state and a collapsed state and a base assembly for providing support for the cage assembly when the cage assembly is in the expanded state to form an enclosure. The base assembly includes a floor having a substantially rectangular shape and having an aperture defined therein and first and second opposing side walls extending upwardly from respective first and second opposing sides of the floor and a third and fourth opposing side walls extending upwardly from respective third and fourth opposing sides of the floor. The first, second, third and fourth side walls and the floor forming a cavity within the base assembly. The base assembly further includes a tray slidingly coupled to the floor, the tray is configured to move between at least a fully closed position, wherein the tray covers the aperture of the floor and forms a portion of the floor, and a fully open position, wherein the aperture in the floor is exposed. The tray and the floor form a substantially continuous surface when the tray is in the fully closed position.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. An animal housing assembly comprising:
   a collapsible cage assembly configured to transition between an expanded state and a collapsed state; and
   a base assembly for providing support for said cage assembly when said cage assembly is in said expanded state to form an enclosure, said base assembly comprising:
      a floor having an upper surface and a lower surface, said floor forming a bottom wall of said animal housing assembly, wherein the floor includes an aperture having inward facing sides, the aperture transitioning from said upper surface to said lower surface of said floor;
      a plurality of base walls extending upwardly from said floor so as to define a cavity within said base assembly, one of said plurality of base walls comprising an opening; and
      a tray comprising a bottom and a single side wall extending upward from an upper surface of the bottom of said tray, wherein:
         when said tray is received within said aperture, said upper surface of the tray forms a portion of the floor that corresponds only to said aperture;
         the bottom of the tray is in direct sliding engagement with the inward facing sides of said aperture such that the tray is moveable between at least a fully closed position and a fully open position;
         when said tray is in the fully closed position, the bottom of said tray obscures said aperture so as to substantially prevent passage of debris from the upper surface of the floor through the aperture, and the sidewall of the tray obscures the opening in said one of said plurality of walls of said base assembly;
         when said tray is in the fully open position the aperture in said floor is at least partially exposed so as to permit passage of debris from the upper surface of the floor through the aperture; and
         when said tray is in said fully closed position, said upper surface of said tray and said upper surface of said floor are substantially coplanar and form a substantially continuous surface.

2. The animal housing assembly of claim 1, wherein said floor has a substantially rectangular shape and said plurality of base walls comprise first and second opposing base walls extending upwardly from respective first and second opposing sides of said floor and a third and fourth opposing base walls extending upwardly from respective third and fourth opposing sides of said floor.

3. The animal housing assembly of claim 2, wherein:
   the opening in said one of said base walls is conjoined with said aperture.

4. The animal housing assembly of claim 2, wherein said first, second, third and fourth base walls terminate at respective edges, wherein at least one respective edge has at least one recess defined thereon, said recess being configured to receive and retain at least one protrusion extending from a portion of said cage assembly.

5. The animal housing assembly of claim 1, wherein said collapsible cage assembly comprises:
   a top panel having a substantially rectangular shape;
   first and second top walls rotatably coupled to respective first and second ends of said top panel; and
   third and fourth top walls rotatably coupled to respective third and fourth ends of said top panel and opposing one another;
   wherein, when said cage assembly is in said expanded state, said first and second top walls oppose one another and said third and fourth top walls oppose one another to form a cage interior.

6. The animal housing assembly of claim 5, wherein at least one of said first, second, third and fourth top walls of said cage assembly has a protrusion extending therefrom and configured to be received within a recess defined on a edge of at lease of said plurality of base walls.

7. The animal housing assembly of claim 5, wherein at least one of said first, second, third and fourth top walls of said cage assembly has at least one door for permitting entry into and egress from said cage interior, wherein said at least one door is pivotally supported and configured to move from a closed position to an open position.

8. The animal housing assembly of claim 7, further comprising a locking member configured to secure said at least one door in said closed position.

9. The animal housing assembly of claim 5, further comprising a shelf member having at least one bracket assembly configured to couple said shelf member to at least one of said first, second, third and fourth top walls of said cage assembly.

10. The animal housing assembly of claim 5, wherein, when transitioning from said expanded state to said collapsed state, at least one of said first, second, third and fourth top walls is configured to rotate relative to said top panel in a direction towards an opposing wall and be folded into a substantially flat engagement with said top panel when in said collapsed state.

11. An animal housing assembly comprising:
   a collapsible cage assembly configured to transition between an expanded state and a collapsed state, said collapsible cage assembly comprises a top panel having a substantially rectangular shape, first and second top walls rotatably coupled to respective first and second ends of said top panel and third and fourth top walls rotatably coupled to respective third and fourth ends of said top panel and opposing one another, wherein, when said cage assembly is in said expanded state, said first and second top walls oppose one another and said third and fourth top walls oppose one another to form a cage interior; and a base assembly for providing support for said cage assembly when said cage assembly is in said expanded state to form an enclosure, said base assembly comprising:
- a floor having a substantially rectangular shape, an upper surface, and a lower surface, said floor forming a bottom wall of said animal housing assembly, wherein the floor includes an aperture having inward facing sides, the aperture transitioning from said upper surface to said lower surface of said floor;
- first and second opposing base walls extending upwardly from respective first and second opposing sides of said floor and a third and fourth opposing base walls extending upwardly from respective third and fourth opposing sides of said floor, said first, second, third and fourth base walls and said floor forming a cavity within said base assembly, one of said first, second, third, and fourth base walls comprising an opening; and
- a tray comprising a bottom and a single sidewall extending upward from an upper surface of the bottom of said tray, wherein:
  - when said tray is received within said aperture, said upper surface of the tray forms a portion of the floor that corresponds only to said aperture;
  - the bottom of the tray is in direct sliding engagement with the inward facing sides of said aperture such that the tray is moveable between at least a fully closed position and a fully open position;
  - when said tray is in the fully closed position, the bottom of said tray obscures said aperture so as to substantially prevent passage of debris from the upper surface of the floor through the aperture, and the sidewall of the tray obscures the opening in said one of said first, second, third, and fourth base walls;
  - when said tray is in the fully open position the aperture in said floor is at least partially exposed so as to permit passage of debris from the upper surface of the floor through the aperture; and
  - when said tray is in said fully closed position, the upper surface of said tray and the upper surface of said floor are substantially coplanar and form a substantially continuous surface.

12. The animal housing assembly of claim 11, wherein: the opening in said one of said first, second, third, and fourth base walls is conjoined with said aperture.

13. The animal housing assembly of claim 11, wherein said first, second, third and fourth base walls terminate at respective edges, wherein at least one respective edge has at least one recess defined thereon, said recess being configured to receive and retain at least one protrusion extending from at least one of said first, second, third and fourth top walls of said cage assembly.

14. The animal housing assembly of claim 11, wherein at least one of said first, second, third and fourth top walls of said cage assembly has at least one door for permitting entry into and egress from said cage interior, wherein said at least one door is pivotally supported and configured to move from a closed position to an open position.

15. The animal housing assembly of claim 14, further comprising a locking member configured to secure said at least one door in said closed position.

16. The animal housing assembly of claim 11, further comprising a shelf member having at least one bracket assembly configured to couple said shelf member to at least one of said first, second, third and fourth walls of said cage assembly.

17. An animal housing assembly comprising:
- a collapsible cage assembly configured to transition between an expanded state and a collapsed state; and
- a base assembly for providing support for said cage assembly when said cage assembly is in said expanded state to form an enclosure, said base assembly comprising:
  - a floor having a substantially rectangular shape, an upper surface, and a lower surface, said floor forming a bottom wall of said animal housing assembly, wherein the floor includes an aperture having inward facing sides, the aperture transitioning from said upper surface to said lower surface of said floor;
  - first and second opposing base walls extending upwardly from respective first and second opposing sides of said floor and a third and fourth opposing base walls extending upwardly from respective third and fourth opposing sides of said floor, said first, second, third and fourth base walls and said floor forming a cavity within said base assembly, one of said first, second, third, and fourth base walls comprising an opening; and
  - a tray comprising a bottom and a single sidewall extending upward from an upper surface of the bottom of the tray, wherein:
    - when said tray is received within said aperture, said upper surface of the tray forms a portion of the floor that corresponds only to said aperture;
    - the bottom of the tray is in direct sliding engagement with the inward facing sides of said aperture such that the tray is moveable between at least a fully closed position and a fully open position;
    - when said tray is in the fully closed position, the bottom of said tray obscures said aperture so as to substantially prevent passage of debris from the upper surface of the floor through the aperture, and the sidewall of the tray obscures the opening in said one of said first, second, third, and fourth base walls;
    - when said tray is in the fully open position the aperture in said floor is at least partially exposed so as to permit passage of debris from the upper surface of the floor through the aperture; and
    - when said tray is in said fully closed position, the upper surface of said tray and the upper surface of said floor are substantially coplanar and form a substantially continuous surface.

18. The animal housing assembly of claim 17, wherein: the opening in said one of said first, second, third, and fourth base walls is conjoined with said aperture.

19. The animal housing assembly of claim 17, wherein said first, second, third and fourth base walls terminate at respective edges, wherein at least one respective edge has at least one recess defined thereon, said recess being configured to receive and retain at least one protrusion extending from a portion of said cage assembly.

* * * * *